Jan. 5, 1932.  W. M. HAMON  1,839,672

FLOW NIPPLE

Filed Dec. 26, 1929

INVENTOR.
Weslie M. Hamon,

BY
ATTORNEY.

Patented Jan. 5, 1932

1,839,672

UNITED STATES PATENT OFFICE

WESLIE M. HAMON, OF BELL, CALIFORNIA

FLOW NIPPLE

Application filed December 26, 1929. Serial No. 416,712.

This invention is a flow nipple particularly applicable to reduction of flow from an oil well, and it is an object of the invention to adjust the aperture of the flow nipple by an extremely simple and practical mechanism which eliminates excessive cutting-out by sand and the like.

It is a further object of the invention to provide a nipple which is adapted for convenient replacement of worn parts without the necessity of taking down the pipe, and which may be readily adjusted so as to provide any predetermined flow aperture.

More particularly it is an object of the invention to provide a nipple having a flow aperture of unobstructed circular cross-sectional area and adapted for ready adjustment of its diameter for predetermined restriction of the flow while maintaining the unobstructed circular area of the aperture, thereby reducing frictional resistance and eliminating excessive cutting-out by sand.

It is a still further object of the invention to adjust the flow aperture by means of peripherally contacting rollers having circumferential grooves which gradually diminish in cross-sectional area so that when the large ends of the grooves are in juxtaposition they define a flow aperture of maximum area, while turning the rollers for successively juxtapositioning the diminishing cross-sectional areas of the grooves will correspondingly decrease the area of the flow aperture, the rollers being journaled for dependent rotation in a suitable casing forming a part of the pipe line, and adapted for ready replacement when worn by simply opening the casing and without taking down the pipe.

Further objects of the invention will be readily understood from the following description of the accompanying drawings, in which.

The nipple is adapted for mounting in any pipe line where it is desired to regulate flow and is particularly applicable to a pipe line leading from an oil well, the nipple being shown as a casing 1 having pipe ends 2 projecting therefrom and adapted for usual threaded connection to sections 3 of a pipe line. The nipple has a bore 4 opening through the casing and its projecting pipe ends so as to communicate with the pipe sections 3, and the bore 4 preferably gradually tapers to a somewhat restricted diameter medially of the casing 1 as shown in Figs. 1 and 2, and thereby forms in effect a Venturi tube.

Figure 1:
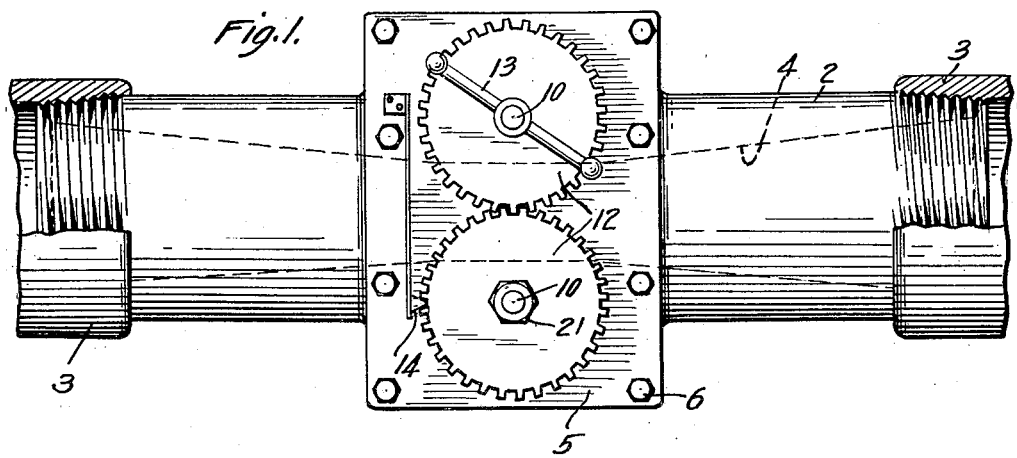
Fig. 1 is a side elevation of the flow nipple in operative position.
Figure 2:
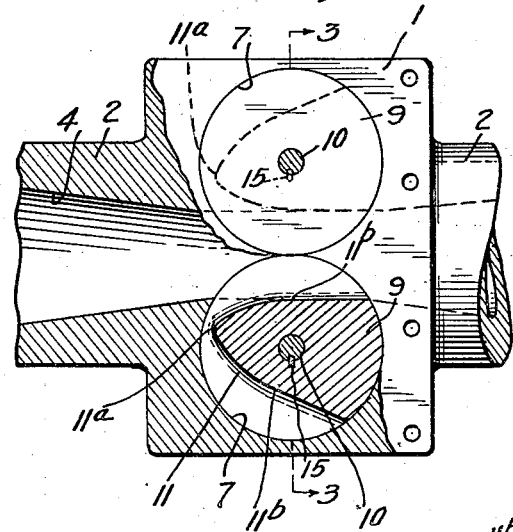
Fig. 2 is a fragmentary side elevation of the nipple with the cover plate removed, and shown partly in axial section.
Figure 3:
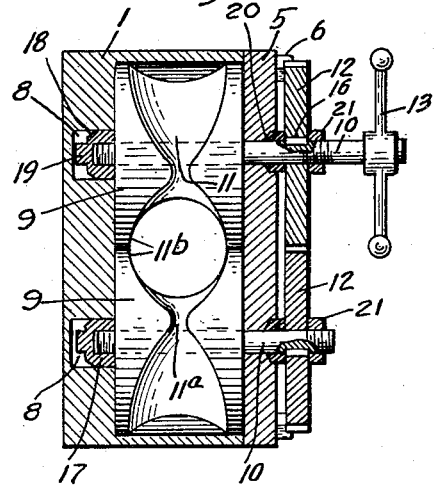
Fig. 3 is a transverse section on the line 3—3 of Fig. 2.
Figure 4:
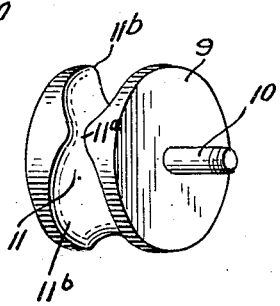
Fig. 4 is a detail perspective view of one of the rollers of the nipple.

The front of casing 1 preferably has a detachable cover plate 5 held in place by suitable bolts 6, the cover plate being shown mounted in place in Fig. 1 and the casing with its cover plate removed being shown in Fig. 2. Bearings 7 extend into the casing equi-distantly above and below the axis of bore 4 as shown in Fig. 2, and terminate in restricted guide bearings 8 as shown in Fig. 3; and rollers 9 which are mounted on shafts 10 are journaled in bearings 7 with the ends of the shafts which project beyond the inner ends of the rollers extending into guide bearings 8, and the outer ends of the rollers lying flush with the front surface of casing 1 and having their projecting shaft ends journaled in and extending outwardly beyond the detachable cover plate 5.

The peripheral surfaces of rollers 9 are adapted for sliding contact so that the rollers are free to rotate, and said peripheral surfaces are grooved as shown at 11 throughout a portion of their circumferences, with the grooves shown as semi-circular in cross-section and preferably of gradually increasing diameter as they extend in both circumferential directions from their medial portions $11^a$, so that the maximum cross-sectional area of the grooves is at their respective ends $11^b$. The rollers 9 are adapted for opposite rotation while maintaining the same relative position so as to juxtaposition either the non-grooved portions of their peripheral surfaces or either pair of the ends 11ᵇ or any corresponding intermediate points along the circumferential lengths of grooves 11; and the cooperating groove ends 11ᵇ are preferably of a cross-sectional area so that when in juxtaposition as shown in Figs. 2 and 3 they define a circular aperture of the same diameter and concentric with the bore 4.

The rollers 9 may be oppositely rotated and at the same time maintain the desired relative positioning of their grooves 11, by means of meshing gears 12 on the ends of shafts 10 which project outwardly beyond cover plate 5, with the projecting end of one of the shafts provided with a suitable operating handle 13. The rotatable rollers may be releasably held at any position providing a flow aperture of desired area, as for example by a spring pressed pawl 14 adapted to engage one of the gears 12 so as to lock the same against accidental rotation but adapted to yield and ride over the teeth of the gear when the latter is intentionally rotated in either direction.

The shafts 10 may be fixed relative to rollers 9 and gears 12 in any suitable manner, preferably by keys 15 and 16, and the ends of shafts 10 which project into bearings 8 may be provided with journals 17 adapted for snug rotation in the bearings and preferably threaded onto the shafts and having tapering outer ends 18 for guiding assembly of the parts, with the tapering ends of the journals preferably terminating in usual heads 19 adapted for engagement by a suitable wrench for tightening the journals on the shafts. Packing 20 is preferably provided between shafts 10 and the outer face of cover plate 5, and the packing may be operatively expanded through axial abutment by gears 12 which may be longitudinally adjusted and locked on the shafts by suitable nuts 21.

The rollers 9 may thus be readily operatively assembled and replaced without disconnecting pipe ends 2 from the pipe sections 3, the cover plate 5 being removed and the journals 17 inserted in bearings 8 so as to rotatably seat the rollers 9 in their bearings 7, and the cover plate 5 being then slipped over the projecting shaft ends and bolted in place, whereupon the gears 12 may be fixed on the projecting shaft ends in meshing relation providing the proper relative positioning of the grooves of rollers 9, and the handle 13 being then secured to one of the shaft ends.

When handle 13 is turned so as to juxtaposition either pair of the cooperating ends 11ᵇ of the grooves, they define a flow aperture of the same diameter and concentric with bore 4 as shown in Figs. 2 and 3, thereby forming an unobstructed and uniform continuation of the bore, and by turning the operating handle so as to juxtaposition corresponding restricted portions of the grooves, the flow aperture is reduced in diameter but retains its unobstructed circular area concentric with bore 4, with the minimum flow aperture obtained when the medial portions 11ᵃ of the grooves are in juxtaposition; and when the flow aperture is thus restricted in diameter, the taper of the grooves in both circumferential directions toward their ends 11ᵇ maintains the Venturi tube effect of bore 4. The flow aperture may be completely closed by turning the rollers until the non-grooved portions of their peripheral surfaces are opposite one another.

I have thus provided a flow nipple adapted for convenient replacement of its rollers, the only parts which are subject to wear, without taking down the pipe; and providing for ready adjustment of the flow aperture while maintaining it of unobstructed cross-sectional area concentric with the bore of the nipple so as to practically eliminate cutting-out by sand and the like.

I claim:

1. In a flow nipple, a casing having a bore, peripherally contacting rollers journaled in the casing transversely thereof so as to close the bore and having circumferential grooves in their peripheral surfaces of gradually decreasing cross-sectional area in opposite circumferential directions from the medial portions of the grooves and adapted for juxtapositioning of corresponding portions thereof so as to define an adjustable flow aperture communicating with the bore.

2. In a flow nipple, a casing having a bore forming a Venturi tube, peripherally contacting rollers journaled in the casing transversely thereof so as to close the bore and having circumferential grooves in their peripheral surfaces of gradually decreasing cross-sectional area in opposite circumferential directions from the medial portions of the grooves and adapted for juxtapositioning of corresponding portions thereof so as to define an adjustable flow aperture communicating with and forming a tapering continuation of the Venturi tube.

3. In a flow nipple, a casing having a bore, flow regulating means for the bore including a transverse member rotatable in the casing, a shaft projecting beyond the inner end of said member, a bearing in the casing, and a journal on the shaft rotatable in the bearing.

4. In a flow nipple, a casing having a bore, flow regulating means for the bore including a transverse member rotatable in the casing, a shaft projecting beyond the inner end of said member, a bearing in the casing, and a journal detachably mounted on the shaft and rotatable in the bearing, the journal having a head adapted for engagement by a tool for detachably mounting the journal on the shaft.

5. In a flow nipple, a casing having a bore, peripherally contacting rollers journaled in the casing transversely thereof so as to close the bore and having circumferential grooves in their peripheral surfaces of gradually diminishing cross-sectional area circumferentially of the rollers, shafts for the rollers projecting beyond the respective ends thereof, bearings in the casing, journals on the shafts which project beyond the inner ends of the rollers, said journals being rotatably mounted in the bearings, and meshing gears on the shafts which project beyond the outer ends of the rollers.

6. In a flow nipple, a casing having a bore, peripherally contacting rollers journaled in the casing transversely thereof so as to close the bore and having circumferential grooves in their peripheral surfaces of gradually diminishing cross-sectional area circumferentially of the rollers, shafts for the rollers projecting beyond the respective ends thereof, bearings in the casing, journals on the shafts which project beyond the inner ends of the rollers, said journals being rotatably mounted in the bearings, a cover plate for the casing having the shafts which project beyond the outer ends of the rollers extending outwardly therethrough, and meshing gears on the shaft ends which extend outwardly beyond the cover plate.

7. A flow nipple having a bore adapted for flow therethrough in either of reverse directions and divergently tapering from its medial portion toward its respective ends, peripherally contacting rollers journaled transversely of the bore medially of its length so as to close the bore and having circumferential grooves in their peripheral surfaces of gradually decreasing cross-sectional area in opposite circumferential directions from the medial portions of the grooves and adapted for juxtapositioning of corresponding portions thereof so as to define an adjustable flow aperture communicating with and forming a tapering continuation of the bore in either of said reverse directions of flow.

In testimony whereof I have affixed my signature.

WESLIE M. HAMON.